C. F. Kramer
T. W. Stephenson
INVENTORS

July 5, 1949.  T. W. STEPHENSON ET AL  2,474,991
STATION WAGON
Filed Nov. 20, 1945  2 Sheets-Sheet 2

C. F. Kramer
T. W. Stephenson
INVENTORS

BY

Patented July 5, 1949

2,474,991

UNITED STATES PATENT OFFICE 2,474,991

STATION WAGON

Thomas W. Stephenson, Detroit, and Clarence F. Kramer, Birmingham, Mich., assignors to Ford Motor Company, Dearborn, Mich., a corporation of Delaware Application November 20, 1945, Serial No. 629,871

12 Claims. (Cl. 296—28)

This invention relates to the construction of bodies for automotive vehicles; and, more particularly, to composite steel and wood bodies of the type generally used on station wagons.

The persistence—and the marked increase in the years immediately preceding the war—of the preference of many persons for the station wagon type of body is particularly remarkable when the many disadvantages of the conventionally constructed body of that type are considered. Despite the many advances made in methods for protecting and forming of wood, that material still remains much less durable than properly finished steel when exposed to the rigorous conditions obtaining in automotive body work. This impermanence is particularly noticeable on two counts in composite bodies: the finish deteriorates with time, and the panels—usually made from plywood—are prone to warp following the disintegration of the adhesive joining the several plies together. The present invention is not directed to either of these phenomena, except in so far as it tends to preserve the plywood panels in their original state by insuring that they will not be subjected to the forces necessarily imposed when the panels serve as stressed structural members. A second disadvantage of the conventional composite type of body is that it is extremely difficult to secure fastening means for the wooden members which will not loosen (principally due to the localized distortion or deterioration of the wood itself) under continued use and when subjected to the vibration necessarily encountered in automotive service. Thus, after some months' use, the conventional composite body has loosened to a point where it is not only unsatisfactory because of the rattles and squeaks in service, but also deteriorates even more rapidly because of the progressive loosening of connections and consequent distortion under stress. In the final stages, the doors cease to close satisfactorily and the windows become difficult—if not impossible—to operate. The wooden frame members or rails which support the panels and serve as the principal structural components of the composite body are subject to decay—particularly around the roof. Further, the roof itself develops leaks under constant vibration. The structural members—if damaged by collision or otherwise, are difficult and expensive to repair or replace.

Apart from these operating difficulties, the composite body—as usually made—does not lend itself particularly well to the requirements of mass production. When wood is used as a stressed member—as it is in the customary composite body—it must be made to certain fits and tolerances if the stresses are to be transmitted according to the design and the load distributed in the manner contemplated by the designer. But wood—even when subjected to the best available treatment—is far from dimensionally stable and components manufactured in the same fixture will show different and varying characteristics a day or so later. This increases the cost of manufacture and of assembly and the instability is further reflected in a weaker structure than could be obtained if the components could be kept within the same tolerances obtaining in metal body processes. Still another disadvantage in manufacture is that incident upon attaching the various wooden components together. Perhaps of all the disadvantages, this is the one which is most serious for as the structure loosens, the body becomes intolerably noisy and the process of deterioration is accelerated.

The advantage in the present construction is that the body is not composite in the accepted sense. Instead, there is substantially a complete steel body; and the wooden members, although they apparently serve as essential structural elements are, in fact, merely a decorative paneling totally unstressed except in the support of their own weight and quite detached, functionally, from the steel body members, roof, doors or windows. Despite the advantages which would accrue from such a construction it is, nevertheless, imperative—considering the particular sales appeal which this type of vehicle must have to be commercially successful—that it not partake of the characteristics of a steel body so far as appearance is concerned. Therefore, the purpose of the present invention is to provide a body which will have the durability and strength of a steel body and yet will have the outward appearance of the ordinary wood panel station wagon. Another object of the invention is to devise a body construction of the station wagon type in which the wood panels, although covering substantially the entire outer surface of the body, nevertheless are not stressed as body members. Still another object is to devise a body construction of the composite type having a unitary continuous metal roof forming an integral part of the body and yet apparently supported by exterior wooden panels.

The advantages of the present construction number, among others, that by employing metal structural elements it is much less difficult than in the conventional body construction to obtain the proper distribution of stresses and uniformity of loading because of the dimensional stability of the prime material. Since the wooden panels are merely applied to the exterior of the body and do not function as primarily stressed elements, their dimensional stability is of secondary importance, and wide variation in size may be accepted without adversely affecting the strength of the structure. Yet another advantage is that so far as fastening the panels is concerned, they need merely be held in place so that simpler fastening methods may be used than practicable when considerable stress is to be transmitted. As a result the fastenings are longer lived, the body remains quiet, and there is no deterioration of the panels due to distortion by improperly imposed loads or loose connections. So far as the customer is concerned, the body has the advantage of increased safety due to the steel construction, longer life, quietness in operation, and assurance that the doors and windows will continue to work as satisfactorily as is the case in an ordinary steel passenger-car body. Nevertheless, the visual appeal of the vehicle is not lessened, for to all intents and purposes, it is still primarily constructed of wood and, among the class described by the late Thorstein Veblen, this consideration alone may well outweigh all others. Other advantages will be more fully apparent from the further consideration of the structure as it is described in this specification, claimed in the following claims, and illustrated in the accompanying drawings, in which:

Figure 1:
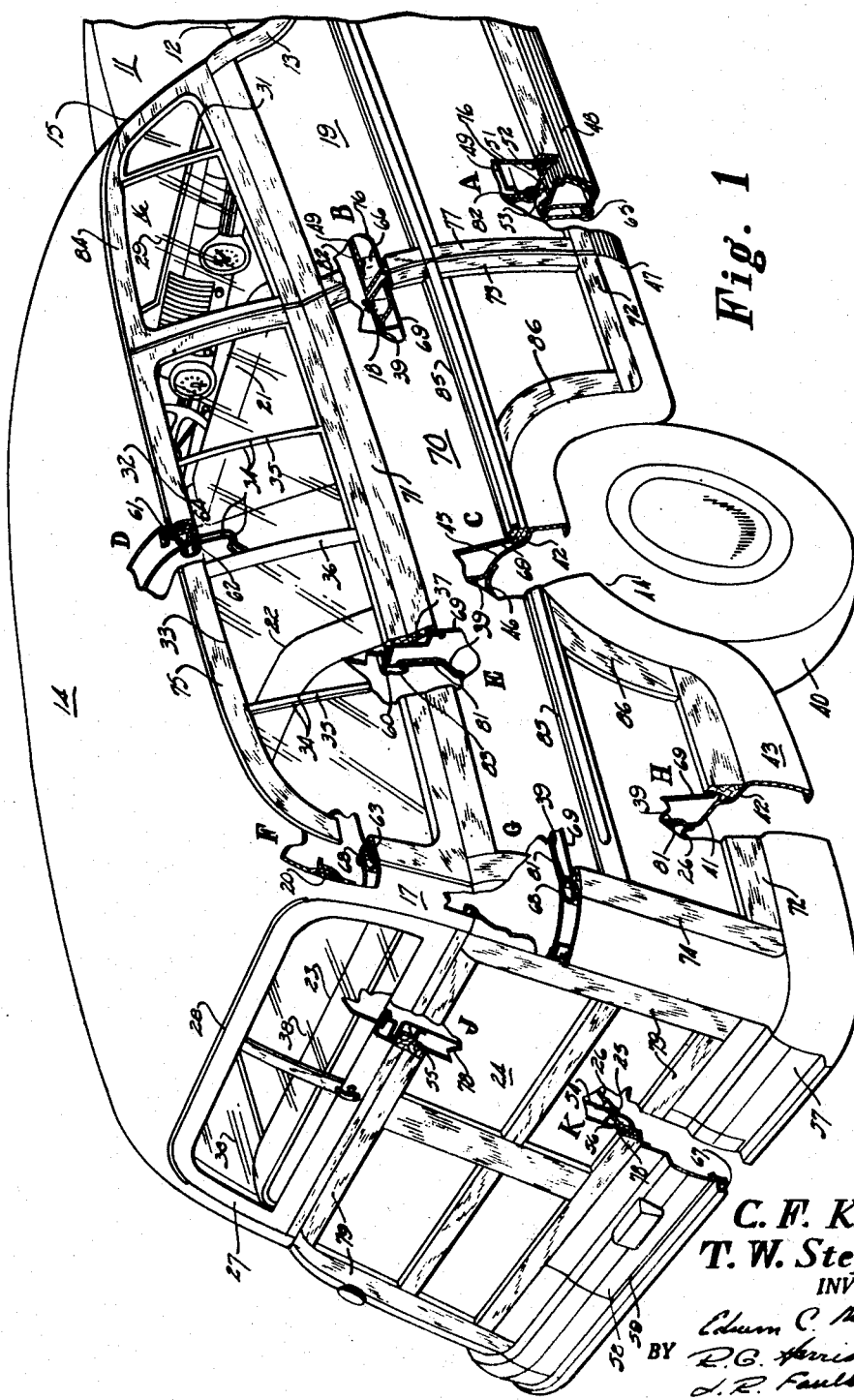
Figure 1 is a perspective view of the rear portion of a station wagon constructed according to the present invention, a number of localized sections being indicated as A, B, C, D, E, F, G, H, J, and K illustrating the underlying construction.

Referring first to Figure 1, the portion shown there comprises practically the entire wooden portion of a typical station wagon. It will be understood that the front portions of the vehicle such as the hood 11 and the front fenders 12 which extend forwardly of the front rail 13 of the door 19 are of metal and constructed according to the same practice obtaining now in ordinary body work as employed in composite station wagon construction. Thus, the sides and rear end of the body have wooden panels. The body includes an integral, continuous roof 14 supported forwardly on the front pillars 15 (which also enclose the windshield 16) and rearwardly on the quarter pillars 17 being attached thereto by the solder joint 20. In addition, there is an intermediate pillar 18 against which the doors 19 hinged forwardly to the pillars 15 abut when closed. The body is usually equipped with three seats 21, 22 and 23, the latter being removable to provide extra space for baggage or supplies. Access to the rear is obtained through a tail gate 24 hinged at 25 to the floor 26 of the vehicle and arranged to swing downwardly; and a swing gate 27 hinged along its top at 28 to the rear edge of the room 14 and arranged to swing upwardly. The door 19 is equipped with a lowerable window 29 of the conventional type and a swinging ventilator 31. The side windows 32 and 33 each comprise two panes 34 of glass which are slidable longitudinally of the car and overlap when closed, as at 35—the two side windows being separated by the post 36 extending between the roof 14 and the upper rail 37 of the body side panel 39 and providing an additional support for the roof across the long window opening. The swing gate 27 is fitted with fixed windows 38.

Figure 2:
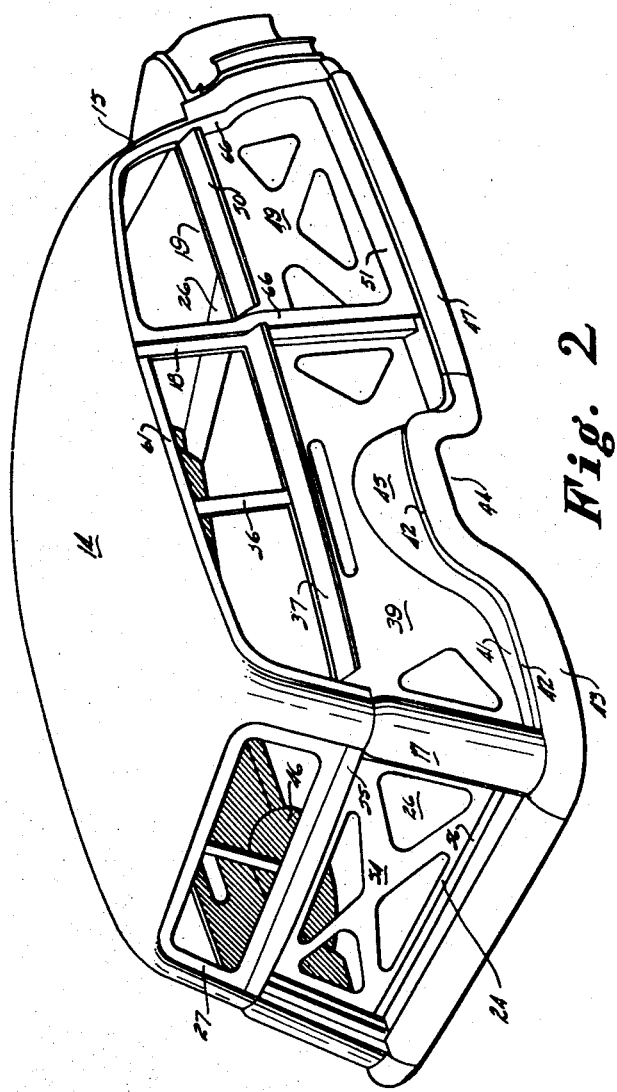
Figure 2 is a perspective view of the metal body forming the basis of the structure shown in Figure 1.

Attention is now directed to Figure 2, showing the conformation of steel body which serves as the basis for the entire structure. Certain parts of this component have already been referred to in the foregoing description such as the roof 14, windshield pillars 15, quarter pillars 17, intermediate pillars 18, door 19, tail gate 24, floor 26, swing gate 27, posts 36 and upper rails 37 of the body side panel 39. Considering first the side panel 39, it will be clear from Figure 2 and from sections B, C, E, G, and H of Figure 1 that it terminates at either end and is secured to the intermediate pillar 18 (Section B) and the corresponding quarter pillar 17 (Section G). At the upper edge (Section E) it is formed in an inverted U for the upper rail 37, and its lower edge (Section H) has an outwardly projecting shelf 41 merging into the recess 42 and thence to a depending flange 43 which serves as the rear rocker panel along the entire side of the body—this panel being the only part of the structure visible in the completed body. The panel 39 further has an arched opening 44, giving access to the wheel 40, and its web is outwardly bowed as at 45 to form a wheel housing in conjunction with the complementary stamping 46 which is secured to the panel 39 about its periphery (Section G).

The rear rocker panel 43 is extended forwardly by the rocker panel 47 carried on the sill 65 of the type disclosed in more detail in copending application Serial No. 608,488 for Body cowl construction and through this portion is covered by a rubber mat 48 forming the steps for access through the door 19. The door 19 comprises a metal web 49 (Figure 2) terminating at its upper edge in a rail 50 and at its lower edge in the horizontal flange 51 to which is attached an angle 52 (Section A). A weatherstrip 53 seals the door to the mat 48. The sides of the door are formed by the generally channel shaped sections 66 secured to the web 49 and adapted to support the wooden door panel which will be described later.

The swing gate 27, as pointed out above, is hinged along its upper edge to the roof 14 and the tail gate is hinged at 25 along its lower edge to the floor 26. While the swing gate is merely a window having a steel frame, the tail gate has a metal web foundation and has a box section 55 at its upper edge (Section J) and a corresponding box section 56 at its lower edge (Section K). The lower edge of the swing gate 27 seats outwardly on the upper box section 55 when both gates are closed and when both are open, the entire rear of the body is opened for easy access.

The rear rocker panel 43 is continuous around the quarter pillar 17 to rear panel 57, which has its central portion cut away to permit the installation of a door 58 hinged along its lower edge at 59 to the bottom member 67 of the rear panel (Section K). The door 58 is swingable inwardly to permit the carrying of a spare tire on the tail gate 24 and reference is made to copending application Serial No. 629,872, filed November 20, 1945, and issued Dec. 23, 1947, as Patent No. 2,433,169, covering a particular construction which may be used, but which is not shown in full detail here.

The steel body also provides the sole support for the side windows 32 and 33 and the windows 29 and 31 in the door. As will be seen in Sections E, F and D, of Figure 1, the upper surface of the upper rail 37 is formed with two channels 60 placed side by side, and the box section 61 along the lower side edge of the roof 14 is provided with similar channels 62. The forward edge of the quarter pillar 17, formed with a box section 68, also incorporates a single channel 63 and much the same construction obtains on the rear edge of the intermediate pillar 18. These channels slidably support the glass panes which, thus, are mounted independently of the wooden panels.

Attention is again directed to Figure 1 as showing the disposition of the outer wooden panel with respect to the steel body. A study of Sections B, C, D, E, F, G and H of that figure shows that the wood side panel 70, which covers the entire side of the steel body and between the side edge of the roof 14 and the rocker panel 43 and the pillars 17 and 18 is, for assembly purposes, a single unit. The lower portion of the panel 70 comprises a plywood sheet 69 completely surrounded by the wooden rails 71 and 72 on the top and bottom and 73 and 74 at the front and rear. In addition, there is a wooden trim member 75 associated with the top wooden rail 71 which outlines the windows 22 and 21.

In the particular panel shown here, there is an intermediate longitudinal rail 85 aligned with the recess 42 at the top of the arched opening 44. This rail is joined with the bottom rail 72 by the two quarter circular rails 86 which outline the rocker panel 43 around the opening. These rails are dovetailed or otherwise secured together consonant with good wood-working practice and provide both a reinforced structure for the panel at its weakest point and a particularly decorative effect.

Figure 3:
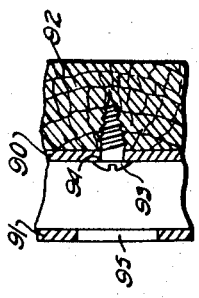
Figures 3 and 4 are partial sectional views showing two methods of attaching the wooden members to the metal body.
Figure 4:
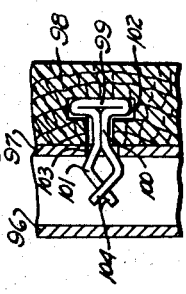

It will be noted (Section H) that the bottom edge of the wooden side panel 70 is secured to the rail 72 which, in turn, is seated in the recess 42 and secured to the steel body as by the wooden screws or other suitable anchoring means. As examples of the fastenings used, attention is directed to Figures 3 and 4 showing two of the possible methods of attachment described in detail later. Similarly, (Section G), the rear edge of the plywood panel 69 is attached to the rail 74 which, in turn, is secured to the box section formed on the forward side of the pillar 17, in which, if screw connections are to be used, suitable openings should be provided in the inner side to permit access.

This type of fastening is shown in Figure 3 in which 90 represents the outer web of a box section member, and 91 the inner. A panel rail is shown at 92 abutting against the outer surface of web 90 and secured in place by the wood screw 93 passing through the hole 94 and driven through the access opening 95 in the webs 91. Alternatively, spring fasteners of the type commonly used in the industry to attach garnish molding to the body may be made up in the rails and the entire panel applied by forcing these expansible retainers into holes stamped in the steel webs. This is illustrated in Figure 4 in which 96 and 97 are the inner and outer webs, respectively, while the panel rail is shown at 98. The fastener is formed from a piece of spring wire bent on itself to form a T head 99 and a narrow shank 100. The wires are then bent to form, in conjunction, a diamond shaped spring structure 101. A T slot 102 extends inwardly of the rail 98 from one edge thereof and the T head 99 and shank 100 of the fastener slides in this slot and may be retained therein either by frictional resistance or by subsequently filling the slot with a hardenable plastic filler. A hole 103 large enough to receive the crossed free ends 104 of the fastener, but smaller than the normal span of the diamond spring 101 is provided in the outer web 97. Upon application of the panel, the ends 104 are inserted in the hole 103 and the panel forced inwardly. This compresses the diamond spring 101 until its maximum span passes through the hole 103. Thereafter the spring re-expands and pulls the rail 98 inwardly into contact with the web 97 and automatically secures it in that position.

While, as shown in sections B and E, the plywood panel may rest against the steel body adjacent its edges, the attachment will still be made directly to the rails 71 and 73, the plywood itself being attached to the rail. In order to minimize leakage between the rails and the adjacent metal members—particularly at the roof, quarter pillar and rocker panel—the respective rails are seated in recesses 64 beneath the roof 14 and outwardly of the box section 61 (Section D), inwardly of the surface of quarter pillar 17 abutting the box section 68 (Section G) or in the rocker panel recess 42 (Section H). At the forward edge of the panel, the joint between the rail 73 and the outer surface of the pillar 18 is protected by the adjacent edge of the door rail 77.

Substantially, the same type of construction is used in the door 19, which has the door wood panel 76 with the edge rails 77 and the window wooden trim member 84 which abuts against and is secured to the corresponding elements of the steel door shown in Figure 2. The wood panel, as is the case with the body panel, is entirely free of the steel body except adjacent its edges and there are no direct securing means solely between the panel and the underlying steel structure. Much the same type of construction is employed on the tail gate 24 where the wooden panel 78 has the edge rails 79 which are secured to the metal structure of the tail gate; and, as before, the plywood panel is free of direct attachment or contact with the underlying metal structure except immediately adjacent its edges.

The inner surface of the steel body is masked by trim panels which may be of the type used in ordinary passenger vehicles comprising a fiberboard covered with upholstery fabric or leather; or, as is more common in this type of work, a varnished wood panel complementing the external appearance of the vehicle. These internal trim panels are indicated at 81 for the side and 82 for the door and generally abut directly against the underlying steel body member, although a layer of sound absorbent material may be applied between them if that be desired. These are preferably secured in place by conventional panel fasteners of the type shown in Figure 4, and their upper edges are concealed by the trim moldings 83.

The advantages of this construction should at once be manifest from the foregoing description. Despite the composite appearance of the vehicle, it is essentially constructed on the basis of a unitary steel body. The plywood panels are not structural elements in the sense of transmitting a portion of the stress normally taken by the steel body in a conventional type of passenger car or the composite panels in a conventional station wagon body; and, indeed, are not fastened directly to the steel framework at all. Rather, the rails bounding the plywood panel provide whatever resistance is required incident to the securing of the panels to the body and these are made adequate in section to withstand any stress which may be occasioned thereby. As a result, the plywood panels last much longer and there is no tendency for the fasteners to become loose and the body to become noisy in continued use. It will be further noted that the entire side panel forms but a single part with relation to the steel body and in assembly may merely be placed against it and secured either by conventional wood screws or by any of the ordinarily used resilient snap fasteners customarily used in automotive construction. The panel may be treated as a unit both in assembly and manufacture and only the external dimensions of the entire piece need be considered when the question of fitting arises. The relative simplicity of the assembly problem is apparent when it is considered that but five individual wooden panels are involved in the entire vehicle; that is, the two doors, the two sides and the tail gate. The resultant increase in economy of assembly and simplicity of service is considerable. Furthermore, since the windows and the sealing surfaces of the doors are independent of any wood construction, both doors and windows will continue to operate freely during the entire life of the vehicle and will remain tight and weatherproof as well. Inasmuch as the outer plywood panels are entirely free from contact with the steel body, except immediately adjacent their edges, the noise problem is reduced and the danger of damage to the wood by decay induced by moisture which would be retained between the panels held in close contact with the steel body, is reduced. Here there is an adequate air space and circulation therethrough keeps the interior of the panel dry and insures its long life. This consideration is not important so far as the interior panels are concerned, since they are normally protected from the elements being within the body of the vehicle.

It is realized that certain changes may be made in the details of the construction shown and described, but it is the intention to cover by the claims such of these changes as are reasonably within the scope thereof.

The invention claimed is:

1. In an automotive body of the station wagon type, comprising, a foundation structure having metal side panels and a continuous metal roof supported on metal pillars at front and rear corners of said body and by intermediate pillars associated with said side panel, a continuous metal rocker panel formed at the bottom of said side panels and extending forwardly to said front pillars and across the back of said structure, said rocker panel being spaced outwardly a substantial distance from said side panel, a door swingably mounted between said front and intermediate pillars, an opening between said roof and said side panel, windows slidably supported between said side panel and said roof in said opening, and a composite external side panel formed of plywood and having wooden edge rails secured on said foundation structure and seated on said rocker panel substantially covering said side panel, said edge rails extending around said opening between said roof and said side panel.

2. In an automotive body of the station wagon type, comprising, a foundation structure having metal side panels and a continuous metal roof supported at its front and rear corners on metal pillars, intermediate metal pillars extending from said roof to the forward edge of said side panels, a rocker panel formed integrally with said side panel and spaced outwardly from the principal plane thereof along the lower edge of said side panel and having extensions forwardly thereof to said front pillars and rearwardly around the back of said structure, said rocker panels being arched upwardly to define wheel openings, said side panel being bowed outwardly adjacent said arched opening to form part of a wheel housing, a complementary stamping secured to said side panel around the margin of said bowed portion to complete said wheel housing, an opening between the top of said side panel and said roof, windows slidably mounted in said side panel and said roof in said opening, and an external wooden side panel comprising a single assembly unit seated on said rocker panel and adjoining said rear pillar and said roof and said intermediate pillar, said external wooden panel consisting of a plywood sheet secured to edge rails, securing means between said foundation structure and said edge rails, said plywood panel being otherwise unsecured with respect to said foundation structure.

3. In an automotive body of the station wagon type, comprising, a foundation structure having metal side panels and a continuous metal roof supported at its front and rear corners on metal pillars, intermediate pillars supporting said roof and associated with said respective side panel, a rocker panel integrally formed with said side panel and extending outwardly from the principal plane thereof, additional rocker panel members aligned with and secured to said rocker panel extending forwardly to said front pillars and rearwardly around the back of said structure, an opening between the top of said side panel and said roof, channels associated with the top of said side panel and the side edges of said roof slidably receiving glass window panes mounted in said opening, an external wooden trim member comprising, a plywood panel secured to wooden edge rails, said edge rail structure including a wooden trim member defining an opening extending above the top of said plywood panel and corresponding to said opening between said roof and said metal side panel, said external wooden trim panel being seated on said rocker panel and adjoining said rear pillar and said roof and said intermediate pillar, said wooden trim member outlining said window opening and masking said channel mountings therearound.

4. The structure of claim 3, which is further characterized in that said external trim panel is secured to said foundation structures by fastening means between said foundation structure and said edge rails, said plywood panel being otherwise unsecured with respect to said foundation member and spaced therefrom a substantial distance a greater part of its extent.

5. The structure of claim 3, which is further characterized in that a metal door structure is swingably mounted between said front and intermediate pillars, said door having an external wooden trim panel secured thereto, said external wooden trim panel comprising a plywood panel having edge rails, said edge rails being secured to said metal door structure and said panel substantially concealing said structure.

6. The structure of claim 3, which is further characterized in that interior trim panels are secured to the inner surface of said side panels, said metal foundation structure being substantially concealed with the exception of said roof, rear pillars and rocker panel.

7. In a composite body construction, a metal body structure having a roof and supporting pillars and side panels including window openings, said metal body structure hingedly supporting a door structure and movably supporting windows in said window openings, and composite wooden external panels attached as units to the exterior of body structure, said external panels comprising a plywood panel secured to wooden edge rails substantially covering said side panels and outlining said window openings, said external panels secured to said body structure through said edge rails, and further characterized in that said roof is supported front and rear and intermediately by said pillars, recesses in said front and rear pillars, said side external panels seated front and rear in the corresponding recesses and substantially covering said intermediate pillars.

8. In a composite body construction, a metal body structure having a roof and supporting pillars and side panels including window openings, said metal body structure hingedly supporting a door structure and movably supporting windows in said window openings, and composite wooden external panels attached as units to the exterior of body structure, said external panels comprising a plywood panel secured to wooden edge rails substantially covering said side panels and outlining said window openings, said external panels secured to said body structure through said edge rails, and further characterized in that said roof is supported front and rear and intermediately thereof by said pillars, recesses in said front and rear pillars and on the side edges of said roof, said side external panels seated front and rear and top in said respective recesses and having the respective edge rails with their outer surfaces substantially flush with the adjacent surfaces of the respective pillars or top.

9. In a composite body construction, a metal body structure having a roof and supporting pillars and side panels including window openings, said metal body structure hingedly supporting a door structure and movably supporting windows in said window openings, and composite wooden external panels attached as units to the exterior of body structure, said external panels comprising a plywood panel secured to wooden edge rails substantially covering said side panels and outlining said window openings, said external panels secured to said body structure through said edge rails and further characterized in that said body structure includes a rocker panel along the sides thereof, said rocker panel being arched to form a rear wheel access opening, said rocker panel about said access opening serving as the external fender for said wheel, said wooden external panel for the side of said body having a cutout portion corresponding to said rocker panel arch, an intermediate longitudinal wooden rail secured to said external panel aligned with the top of said rocker panel arch, curved wood edge rails corresponding to the curvature of said rocker panel arch and secured at their lower ends to the lower edge rail of said external panel and at their upper ends to said intermediate wood rail, said curved edge rails outlining said rocker panel over said wheel opening.

10. In a composite body construction, a metal body structure having a roof and supporting pillars and side panels including window openings, said metal body structure hingedly supporting a door structure and movably supporting windows in said window openings, and composite wooden external panels attached as units to the exterior of body structure, said external panels comprising a plywood panel secured to wooden edge rails substantially covering said side panels and outlining said window openings, said external panels secured to said body structure through said edge rails and further characterized in that said body structure includes a rocker panel along the sides thereof, said rocker panel being arched to form a rear wheel access opening, said rocker panel about said access opening serving as the external fender for said wheel, said wooden external panel for the side of said body having a cutout portion corresponding to said rocker panel arch, an intermediate longitudinal wooden rail secured to said external panel aligned with the top of said rocker panel arch, curved wooden edge rails corresponding to the curvature of said rocker panel arch and secured at their lower ends to the lower edge rail of said external panel and at their upper ends to said intermediate wooden rail, a recess formed in said side panel inwardly of and paralleling said rocker panel, said wooden external panel for said side having its lower edge seated in said recess.

11. In a composite body construction, a metal body structure having a roof and supporting pillars and side panels including window openings, said metal body structure hingedly supporting a door structure and movably supporting windows in said window openings, and composite wooden external panels attached as units to the exterior of body structure, said external panels comprising a plywood panel secured to wooden edge rails substantially covering said side panels and outlining said window openings, said external panels secured to said body structure through said edge rails and further characterized in that said body structure includes a rocker panel along the sides thereof, said rocker panel being arched to form a rear wheel access opening, said rocker panel about said access opening serving as the external fender for said wheel, said wooden external panel for the side of said body having a cutout portion corresponding to said rocker panel arch, an intermediate longitudinal wooden rail secured to said external panel aligned with the top of said rocker panel arch, curved wooden edge rails corresponding to the curvature of said rocker panel arch and secured at their lower ends to the lower edge rail of said external panel and at their upper ends to said intermediate wooden rail, a recess formed in said side panel inwardly of and paralleling said rocker panel, said wooden external panel for said side having its lower edge seated in said recess, said external wooden panels being secured to said metal body structure adjacent their edges and being otherwise spaced a substantial distance from said body structure.

12. In a composite body construction, a metal body structure having a roof and supporting pillars and side panels including window openings, said metal body structure hingedly supporting a door structure and movably supporting windows in said window openings, and composite wooden external panels attached as units to the exterior of body structure, said external panels comprising a plywood panel secured to wooden edge rails substantially covering said side panels and outlining said window openings, said external panels being secured to said body structure through said edge rails and being substantially structurally unstressed, said body structure including a rocker panel along the sides and back thereof, said side rocker panel being arched to form a rear wheel access opening, said rocker panel about said access opening serving as the external fender for said wheel, said rocker panel for at least a part of its extent being integral with said side panel, said side panel being bowed outwardly adjacent said arched opening to form a part of a wheel housing, and a complementary component secured to said side panel around the margin of said bowed section to complete said wheel housing.

THOMAS W. STEPHENSON.
CLARENCE F. KRAMER.

REFERENCES CITED

The following references are of record in the file of this patent:

UNITED STATES PATENTS

| Number | Name | Date |
|---|---|---|
| D. 136,355 | Stevens | Sept. 14, 1943 |
| 753,315 | Romunder | Mar. 1, 1904 |
| 1,307,044 | Friedrich | June 17, 1919 |
| 1,641,319 | Childs | Sept. 6, 1927 |
| 1,674,394 | Hansen | June 19, 1928 |
| 2,155,147 | Nelson | Apr. 18, 1939 |
| 2,190,227 | Best | Feb. 13, 1940 |
| 2,269,451 | Ford | Jan. 13, 1942 |
| 2,356,624 | Schulz et al. | Aug. 22, 1944 |

FOREIGN PATENTS

| Number | Country | Date |
|---|---|---|
| 297,593 | Great Britain | 1928 |